June 25, 1968 A. GOERG 3,390,402
APPARATUS FOR COUNTERCURRENT WASHING OF MOTHER
LIQUOR FROM SOLID PRODUCTS
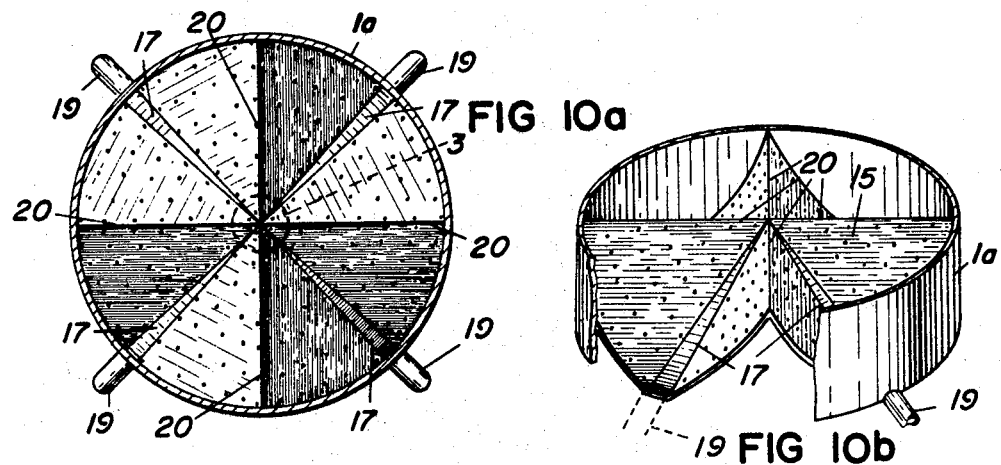
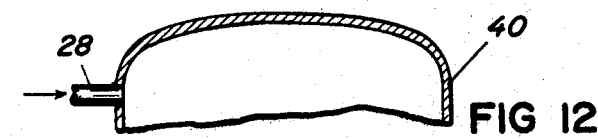
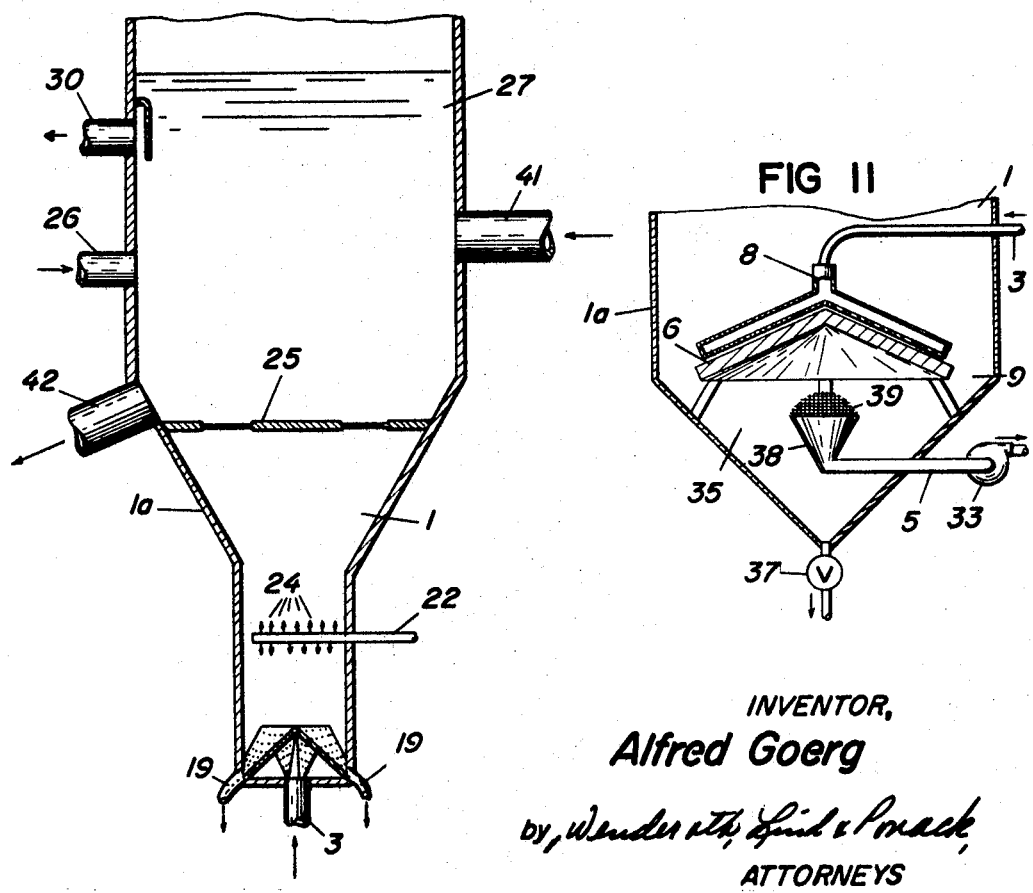
INVENTOR,
Alfred Goerg
ATTORNEYS

# United States Patent Office 3,390,402
Patented June 25, 1968

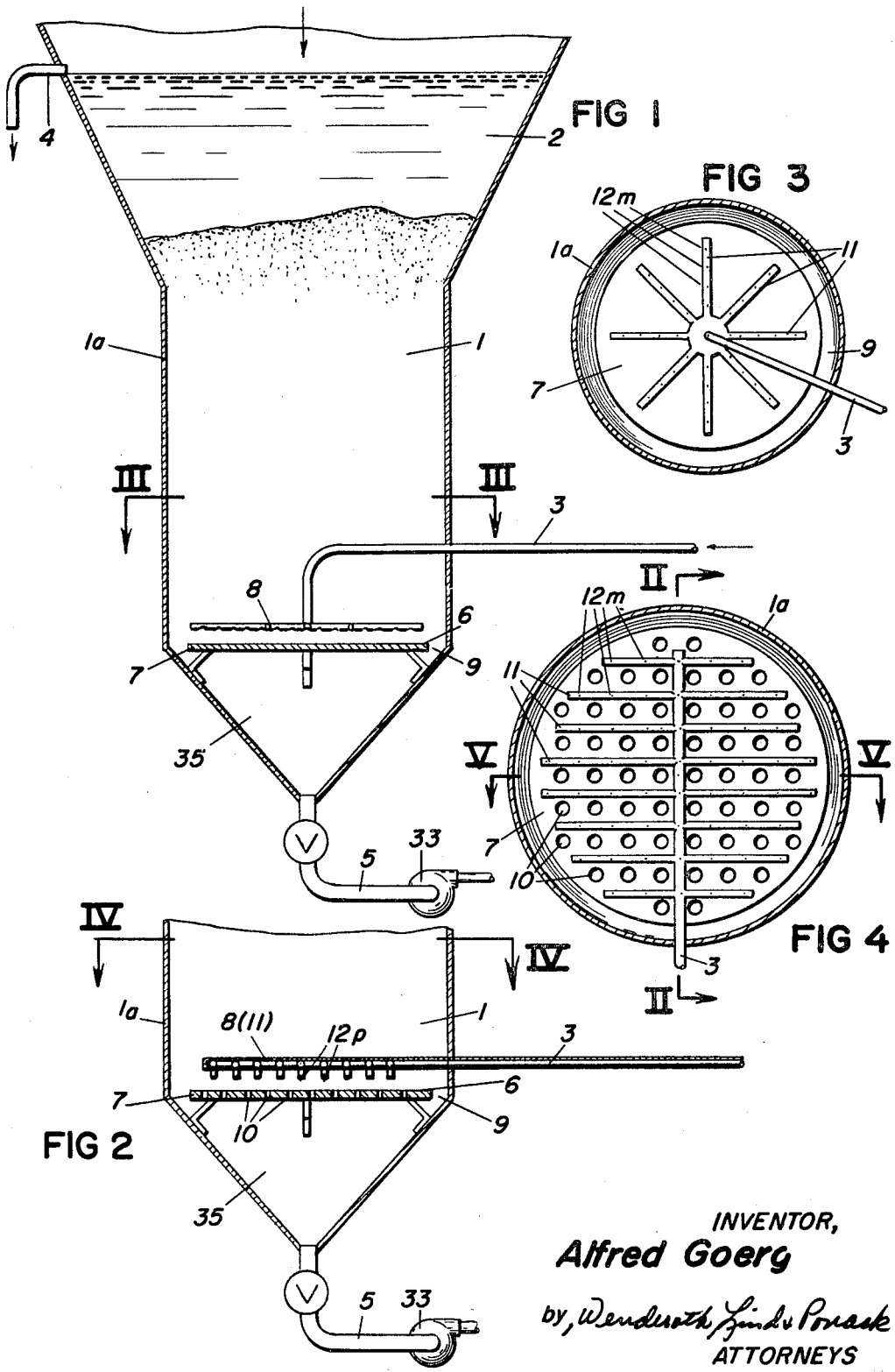

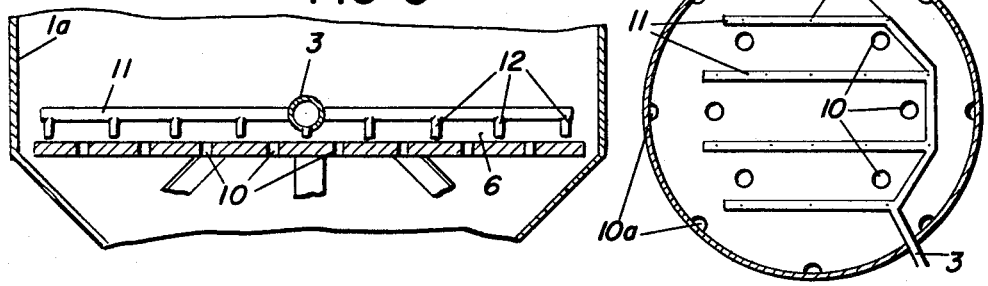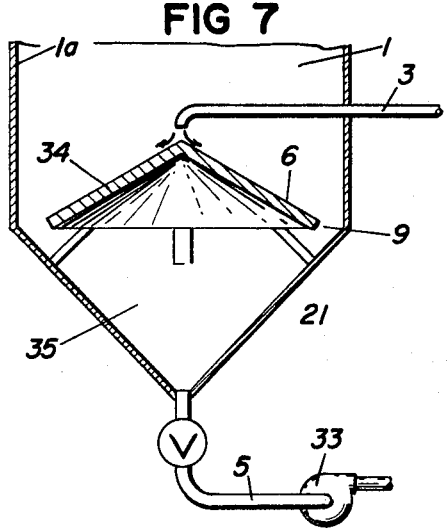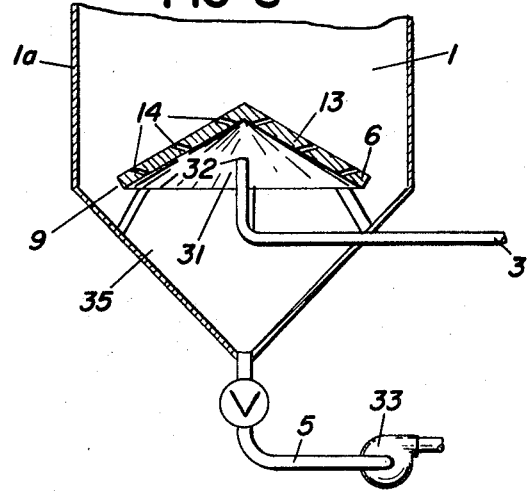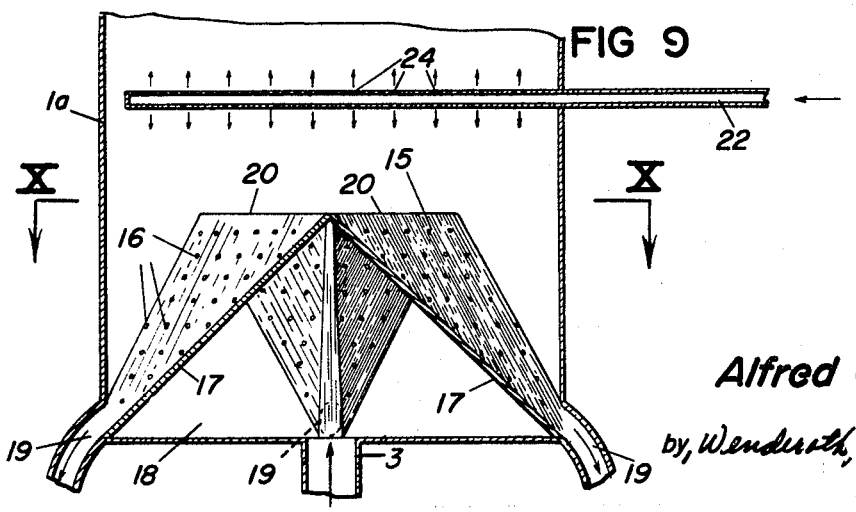

3,390,402
APPARATUS FOR COUNTERCURRENT WASHING OF MOTHER LIQUOR FROM SOLID PRODUCTS
Alfred Goerg, Blonay, Vaud, Switzerland, assignor to Ciba Limited, Basel, Switzerland, a Swiss Company
Original application Aug. 5, 1963, Ser. No. 300,017, now Patent No. 3,309,177, dated Mar. 14, 1967. Divided and this application Mar. 10, 1967, Ser. No. 635,935
Claims priority, application Switzerland, Aug. 6, 1962, 9,371/62; July 16, 1963, 8,874/63
1 Claim. (Cl. 23—270)

This application is a division of application Ser. No. 300,017 filed Aug. 5, 1963, now United States Patent 3,309,177.

In many chemical processes chemical products are obtained in solid form from solutions, for example by crystallisation or precipitation. The solid product must then be separated from the mother liquor in some way or other, for example by filtration, centrifuging or the like. However, no complete separation can be achieved in this manner; in fact, a certain amount of mother liquor, together with any impurities present in it, still adheres to the solid product so that a further washing operation is needed to obtain the solid product in pure form. This involves the disadvantage that during the said washing operation a certain proportion of the solid product again passes into solution and is thus lost. For washing the solid product in a filter or centrifuge a relatively large amount of washing water is needed, and accordingly the amount of redissolved, lost solid product is relatively large. In addition, extensive plant is needed for the continuous operation of this process.

By centrifuging or filtration the solid product is separated from the washing liquid (solvent). However, such a separation is always unnecessary when the solid product is subsequently further processed with an identical liquid, as is the case, for example, with sodium chloride in the electrolysis of mercury, where all that necessary is to remove the impurities present in the mother liquor. For this reason it has been proposed to wash the solid product in a column. In this column the washing liquid is conducted in an upward direction, the solid product being fed in at the top and, owing to its specific gravity, travelling downwards through the washing liquid and then being withdrawn at the foot of the column. This process likewise requires the use of substantial amounts of washing liquid, apart from large size columns.

According to another proposal the mother liquor is displaced by the washing liquid by pressing the latter through the solid product which is present in a more or less compact form. By virtue of the compact form of the solid product the size of the apparatus required is substantially smaller than in the case of the process referred to above. In the most favourable case the requisite amount of washing liquid is at most insignificantly larger than the amount of mother liquor to be displaced. A prerequisite for the successful displacement of the mother liquor in such a process is that the solid product must not be stirred up by the washing liquid. Furthermore, the washing liquid must penetrate the solid product evenly, that is to say, no channels must form within the solid matter. In actual practice, more especially when large installations are used, this involves considerable difficulties which have not yet been overcome. The object of the present invention is an extremely simple solution to this problem.

The invention provides apparatus for continuously washing the mother liquor out of solid products by means of a washing liquid which comprises a vertically mounted washing vessel into which the mother liquor containing the solid product can be introduced at the top and the washing liquid at the bottom, the vessel having in its lower portion at least one discharge conduit for solid material and washing liquid and in its upper portion at least one discharge conduit for mother liquor and washing liquid, a settling bottom for the solid product being situated within the lower portion of the washing vessel which covers the greater part of the cross-sectional area of the vessel, the settling bottom and at least one inlet conduit for the washing liquid being so constructed and arranged in relation to one another that the washing liquid flows over the settling bottom.

In the present invention it has been found that the solid particles deposited on the settling bottom form a homogeneous column moving slowly downwards. Of the washing liquid flowing over the settling bottom part rises through the solid particles and displaces the mother liquor. The bulk washes the layer of solid particles deposited on the settling bottom to the discharge conduit. Even when large vessels are used, no channels are formed. This is probably due to the fact that the rising portion of the washing liquid flows evenly off the settling bottom and the column of solid particles promotes an even flow of the washing liquid, and that the continuous flowing off of the bottom layer of the column causes the solid particles to be deposited evenly over the cross-section of the column.

Several forms of the invention will now be described by way of example in greater detail with reference to the accompanying drawings, in which:

FIGURES 1, 2, 7, 8, 9 and 11 represent six forms of apparatus in accordance with the invention, each being shown in axial section, FIGURE 3 is a section along the line III—III in FIG. 1, FIGURE 4 is a section along the line IV—IV in FIG. 2, FIGURE 5 is a section along the line V—V in FIG. 4, FIGURE 6 shows another form of the components shown in plan view in FIGURE 4, FIGURE 10a is a section along the line X—X in FIG. 9, FIGURE 10b is a perspective view of the apparatus shown in FIGURE 10a, and FIGURE 12 is a partially sectioned view of an installation in which the washing vessel is attached to the lower portion of an evaporator.

Referring to FIGURES 1, 2, 7, 8, 9 and 11 of the drawings, the washing vessel 1 (which is preferably of circular cross-section) is provided with an upper inlet opening 2, an inlet duct 3 for the washing liquor, an upper discharge conduit 4 for mother liquor and part of the washing liquid, a lower discharge conduit 5 for solid product and the remainder of the washing liquid, and a settling bottom 6 for the solid product. In the apparatus shown in the drawings the inlet opening 2 is formed by the vessel being flared conically outwards at the top. The upper discharge conduit 4 is in the form of an over-flow pipe. As shown in FIGURE 1, a suction pump 33 may be provided in the conduit 5.

In the forms of the apparatus shown in FIGURES 1 and 2, the settling bottom 6 is formed by the upper surface of a plate 7 which is disposed in a horizontal plane. The end of the inlet conduit 3 within the vessel 1 is provided with a sprinkler-like distributor 8 formed by pipes 11. This distributor 8 is located a short distance above the plate 7 and parallel to it, its sprinkler openings being directed towards the plate.

In the form shown in FIGURES 1 and 3, the plate 7 is a solid plate. Between the edge of the plate 7 and the wall 1a of the washing vessel 1, there is a gap 9, and this gap has a width which is preferably equal to at least 20 times the largest size of solid particles that come into consideration.

In the apparatus shown in FIGURES 2, 4 and 5, the plate 7 is perforated, the perforations 10 in the plate 7 and the sprinkler openings 12 of the distributor 8 being off-set so that they are not directly above one another. The sprinkler openings 12 are indicated in FIG. 2 by the arrows 12p which show the direction of the flow of liquid from the distributor 8, and in FIGS. 2 and 3 by the dots 12m. Instead of the combination of the perforated plate and the distributor as shown in FIGS. 4 and 5, the apparatus shown in FIG. 2 may be provided with a distributor and a perforated plate as shown in FIG. 6 of the drawings.

The cross-sectional area of each perforation 10 in the plate 7 is advantageously 20 times the maximum cross-sectional area of the largest solid particle concerned. When the perforations 10 are circular in cross-section, their diameter should advantageously be at least 20 times the largest dimension of the largest solid particle concerned. When perforated plates are used, the gap between the edge of the plate 7 and the wall of the vessel 1 can be dispensed with, but, as shown in FIG. 6 cut-outs 10a may be provided in the edge of the plate 7.

Referring to FIG. 3 of the drawings, the pipes 11 of the distributor 8 may be arranged in a star-shaped manner or, as shown in FIGS. 4 and 6, they may be arranged parallel to one another. The forms represented by FIGS. 4 and 6 are preferably so designed that the sprinkler openings 12 (12m, 12p) of the distributor 8, and advantageously also the perforations 10 in the plate 7, are evenly distributed over the cross-sectional area of the washing vessel 1. This arrangement makes these forms especially suitable for use in large pieces of apparatus, that is to say, in washing vessels having a diameter larger than about 120 cm.

According to another form of apparatus according to the invention, the settling bottom is formed by the upper surface of a structure which tapers in an upward direction and which therefore has a diminishing cross-sectional area. The inlet conduit for the washing liquid ends a short distance above the highest point of this surface, the washing liquid being directed on this surface, and between the bottom edge of the structure and the wall of the vessel there is provided a gap and in the portion of the vessel underneath the settling bottom there is provided a discharge conduit for the solid product and the washing liquid. Preferably, and as shown in FIG. 7 of the drawings, the structure which forms the settling bottom 6 is a cone 34 whose apex points upwards, the inlet conduit 3 for the washing liquid being provided with an opening situated a short distance above the apex of the cone. Alternatively, the washing liquid may be injected through a distributor device consisting of a number of pipes arranged parallel to the cone surface.

In the forms of the apparatus described above, the washing liquid is directed from above on to the settling bottom so as to run over this bottom, whereupon it carries away the solid product in direct contact with the bottom and transports it through the gap 9 between the wall of the vessel and the edge of the settling bottom, and through the perforations 10 (if present) in the latter, into the lower portion of the washing vessel, whence the solid product can be withdrawn through at least one discharge conduit 5. In many cases, however, it is of advantage to introduce the washing liquid from below through the settling bottom, for which purpose the latter must, of course, be perforated. In such a case the installation is, as a rule, so designed that the settling bottom is formed by the upper face of an upwardly tapering perforated hood (of diminishing cross-sectional area), the inlet conduit for the washing liquid opening into the cavity underneath the hood. Between the bottom edge of the hood and the wall of the vessel there is provided a gap, and in that portion of the vessel underneath the gap (termed the collecting chamber) there is located at least one discharge means for the solid product and the washing liquid. The width of the gap between the wall of the vessel and the bottom edge of the hood is advantageously at least 20 times the maximum dimension of the largest solid particle involved. Apparatus of this kind is shown in FIGS. 8, 9, 10 and 12.

Referring to FIG. 8 of the drawings, the hood forming the settling bottom 6 is a cone 13 provided with a plurality of perforations 14, and the inlet conduit 3 for the washing liquid opens into the cavity 31 within the cone. The width of the gap 9 between the lower edge of the cone 13 and the wall 1a of the washing vessel 1 is advantageously at least 20 times the maximum dimension of the largest solid crystal.

The discharge conduit 5 for the solid product and the washing liquid is located underneath the cone 13 and underneath the end 32 of the inlet conduit 3 for the washing liquid.

FIGS. 9, 10a and 10b show an especially advantageous form of the apparatus according to the invention, wherein the settling bottom 6 is formed by the upper surface of a hood 15 whose bottom edge abuts on the wall of the vessel and which tapers off upwardly. The hood is provided with perforations 16 and gutter-like indentations 17 which have an increasing cross-sectional area and an increasing depth and which lead from the top of the hood down to the vessel wall, where they end in outlet openings 19 for the solid product and the washing liquid. The inlet conduit 3 for the washing liquid opens into the cavity 18 below the hood 15. As shown in the drawing, the slanting side walls of adjacent gutters 16 enverge at the top to form an edge 20, and it is of advantage to arrange all the edges 20 to lie within a single horizontal plane.

Further, according to the invention and as shown in FIGS. 1, 2, 7, 8 and 11, the walls of the portion of the washing vessel underneath the settling bottom 6 converge downwardly in the form of a funnel so as to form a collecting chamber indicated by the reference numeral 35. At the base of this funnel is situated the discharge conduit 5 for the solid product and the washing liquid. As shown in FIG. 7, this arrangement may be so designed that facing the discharge conduit 5 there is provided an additional inlet conduit 21 for washing liquid which opens into the chamber 35, the jet of liquid issuing from this conduit being directed towards the discharge conduit 5. This device ensures a reliable and rapid removal of the solid product.

Referring to FIG. 9 of the drawings, at least one additional inlet 22 for washing liquid leads into the washing vessel above the settling bottom 6. Preferably and as shown in FIG. 9, the washing liquid is injected through a horizontally disposed tube distributor 24 which may be designed similar to the distributor 8 (as shown in FIGS. 2 to 6). The washing liquid fed in through the additional inlet conduit 22 produces most of the actual washing effect, while the washing liquid injected from underneath through conduit 3 is mainly used to transport the solid product. In this manner it is in some cases possible to effect savings in washing liquid.

FIG. 11 illustrates another form of apparatus according to the invention which is particularly suitable for processing a mixture of solid products and mother liquor that contains crusts or lumps. In this form the settling bottom 6 is conical in shape so that crusts or lumps which are deposited on it slide off and enter the collecting chamber 35 through the annular gap 9. In the collecting chamber they settle at the lowest point and can be removed periodically through a valve 37 and thus taken out of the apparatus. The outlet 38 for the useful solid product is funnel-shaped and provided with a strainer 39 so that no crusts can enter the discharge conduit 5 and the pump 33.

According to another feature of the invention the washing vessel is attached to the lower portion of an evaporator. A preferred modification of this kind is shown diagrammatically in FIG. 12 of the drawings in which the evaporator 40 forms a structural unit with the washing vessel 1. Between the evaporator 40 and the washing vessel 1 it is of advantage to provide a strainer 25, which, on the one hand, stabilises the flow and, on the other hand, prevents any crusts or lumps from falling into the washing vessel. When there is no danger of crusts or lumps forming in the evaporator, the strainer may be replaced by baffles.

The evaporator 40 is of the usual design. The solution to be processed is suitably heated and then fed through conduit 26 into the evaporator chamber 27, where the solid product crystallises out and drops through the strainers 25 into the washing vessel 1. The vapours are extracted by a compressor (not shown in the drawing) through a conduit 28. The mother liquor, freed from the solid product, leaves the evaporator through another conduit 30. Alternatively, the solution to be processed may be introduced into the process directly underneath the strainer 25. A revolving and heating circuit of the generally known kind may be connected with unions 41 and 42.

The washing vessel 1 shown in FIG. 12 is of the form shown in FIG. 9, and the essential components bear the same reference numerals as in FIG. 9.

Within the scope of the invention it is, of courses, possible to combine any one of the washing vessels described above with any suitable type of evaporator.

As a rule the installation of the invention is arranged so that the bulk of the washing liquid injected into the vessel runs over the settling bottom 6 and is removed together with the solid product. Advantageously, 60 to 95% of the total quantity of washing liquid injected is removed with the solid product or effects the transport of the latter. The remainder of the washing liquid, which runs in a direction counter to the solid product. Displaces the mother liquor in the upward direction and escapes together with it through the upper discharge conduit.

The washing liquid used is advantageously a saturated solution of the pure solid product which is to be separated.

The sprinkler openings 12 of the distributor 8 for the washing liquid or the perforations 16 of the form of the apparatus shown in FIGS. 9, 10a and 10b have a diameter of about 0.5 to 2 mm., the diameter of the washing vessel being within the range of 200 to 2000 mm. In FIGS. 5 or 9, 10a and 10b the size of the openings 12 and 16 respectively is exaggerated for drawing reasons.

What is claimed is:

1. An installation for continuously washing the mother liquor out of solid products by means of a washing liquid, comprising a vertically mounted washing vessel, an inlet in the upper portion of said vessel for injecting solid product containing mother liquor into said vessel from the top, an inlet in the bottom portion of said vessel for introducing washing liquid from below, a discharge duct in the upper portion of said vessel for discharging mother liquor and washing liquid, and a settling bottom for the solid product in the lower portion of said vessel, said settling bottom being constituted by the upper surface of an upwardly inwardly tapering-off hood-like structure whose bottom edge is joined about its periphery to the wall of said vessel, said settling bottom being perforated and having gutter-like indentations which increase in cross-section and in depth and lead from the highest point of said settling bottom straight to the wall of said vessel where they end in outlet openings for the solid product and the washing liquid, said inlet for washing liquid debouching into the cavity between the lower side of said settling bottom and the bottom of said vessel.

References Cited
UNITED STATES PATENTS

| | | | |
|---|---|---|---|
| 57,218 | 8/1866 | Thomas | 23—272 |
| 1,807,263 | 5/1931 | Walter | 23—270 X |
| 2,381,965 | 8/1945 | Berry | 23—270 |
| 2,738,323 | 3/1956 | Tepas | 23—272 |
| 2,990,260 | 6/1961 | Mungen | 23—284 X |
| 3,155,697 | 11/1964 | Jurgen-Lohmann | 23—270 X |
| 3,226,202 | 12/1965 | Nogelvoort | 23—267 |
| 3,294,624 | 12/1966 | Sloman | 23—270 X |

NORMAN YUDKOFF, *Primary Examiner.*

S. J. EMERY, *Assistant Examiner.*